Figure 1:
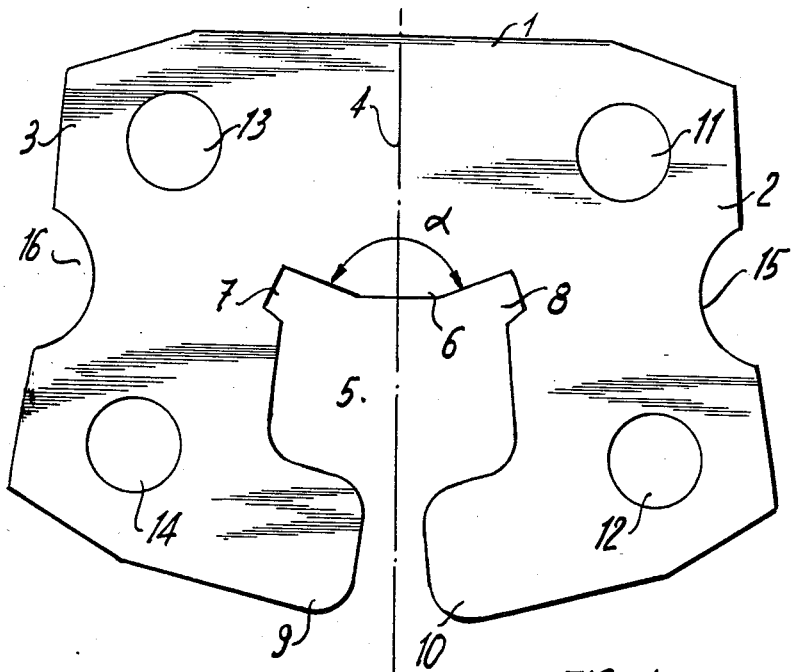

United States Patent

Weigel

Patent Number: 4,606,253
Date of Patent: Aug. 19, 1986

[54] CUTTING LINK FOR A CHAIN CUTTER

[75] Inventor: Henri Weigel, Paris, France

[73] Assignee: Hew & Milan Development S.A., Switzerland

[21] Appl. No.: 479,034

[22] Filed: Mar. 25, 1983

[30] Foreign Application Priority Data

Mar. 25, 1982 [CH] Switzerland .................. 1821/82

[51] Int. Cl.⁴ .................................. B27B 33/14
[52] U.S. Cl. ................................ 83/830; 83/835; 83/831; 83/839
[58] Field of Search ............... 83/830, 831, 832, 833, 83/834, 839–845

[56] References Cited

U.S. PATENT DOCUMENTS

| | | | |
|---|---|---|---|
| 2,746,494 | 5/1956 | Cox | 83/831 |
| 2,798,517 | 7/1957 | Carney | 83/830 |
| 2,862,533 | 12/1958 | Mall | 83/834 |
| 2,976,900 | 3/1961 | Mills | 83/834 |
| 2,994,350 | 8/1961 | Lundberg | 83/345 |

FOREIGN PATENT DOCUMENTS

| | | | |
|---|---|---|---|
| Ad.26986 | 12/1923 | France | 83/830 |
| 1222866 | 1/1960 | France | 83/830 |
| 350458 | 1/1961 | Switzerland | 83/830 |
| 937716 | 9/1963 | United Kingdom | 83/830 |

Primary Examiner—Donald R. Schran
Attorney, Agent, or Firm—Ostrolenk, Faber, Gerb & Soffen

[57] ABSTRACT

The link comprises a support member 1 adapted to slide on a blade, and a cutting element 20 solidly connected to the support member. The support member 1 has two spaced parallel flanks interconnected by a rounded portion 30. The cutting element 20 takes the form of a small metal plate arranged transversely with respect to the two flanks 2, 3 in an opening 5 provided for this purpose, and the rear surface of which has a central stud 27 enclosed by the two flanks 2, 3 and by the rounded portion 30. The small plate 20 is made of tungsten carbide and is located at its lower end its engagement in two notches 7 and 8 formed in the support member 1.

11 Claims, 8 Drawing Figures

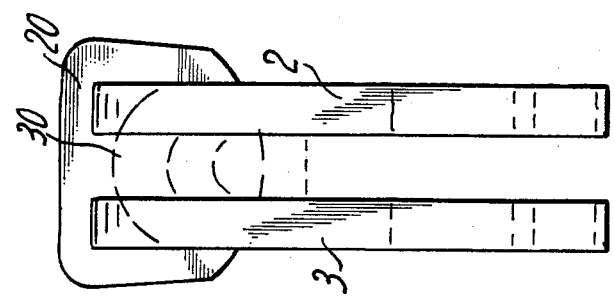
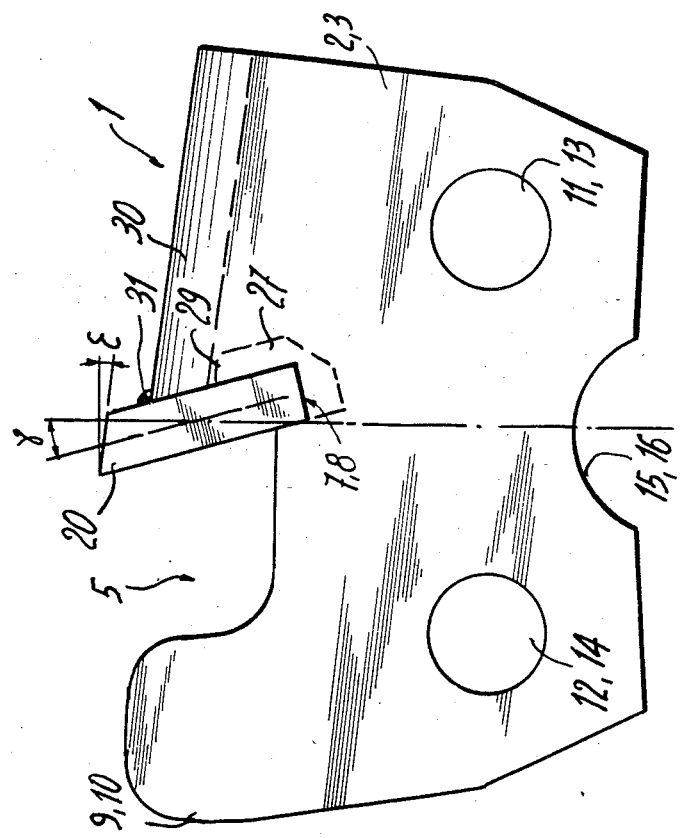

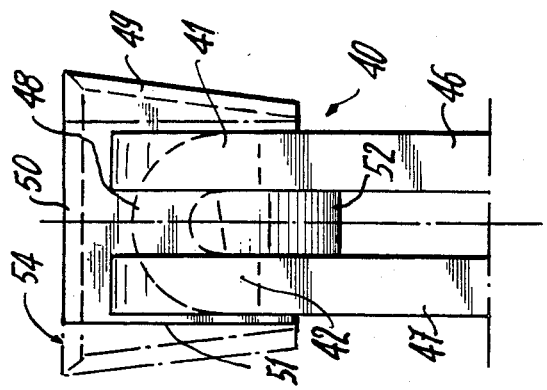
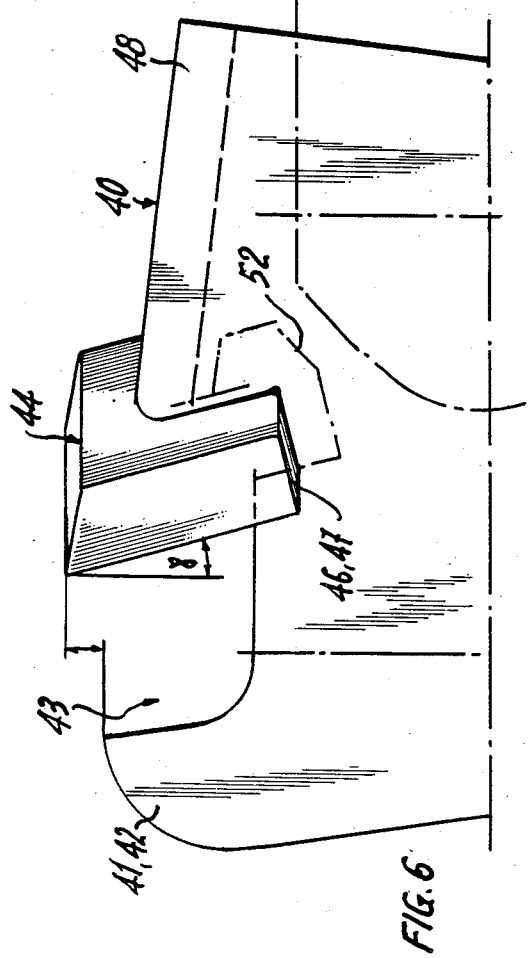
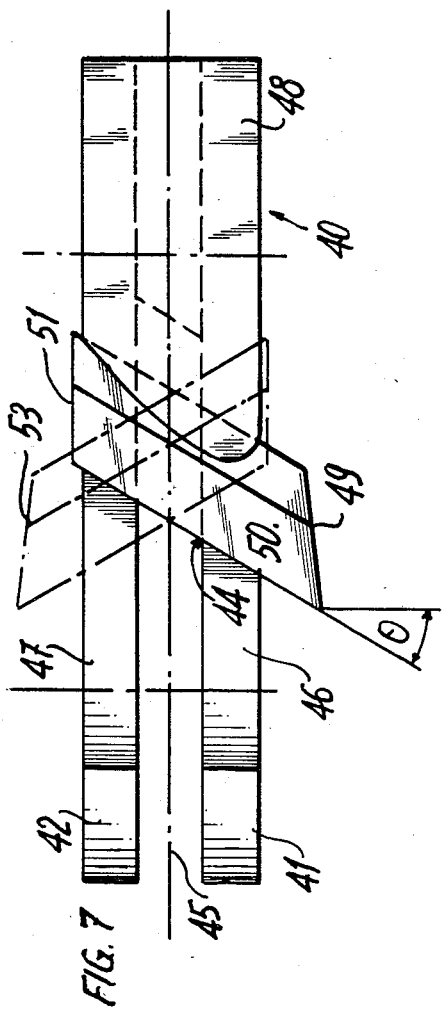
FIG. 6
FIG. 7
FIG. 8

CUTTING LINK FOR A CHAIN CUTTER

The invention concerns a cutting link for a chain cutter of a chain saw, more particularly but not exclusively for a machine for cutting to length.

Chain cutters for machines for cutting to length usually comprise three kinds of link: the cutting links, the connecting or joint links and the guide and/or drive links. Chain cutters made up of these three types of link slide on blades having a rounded end and are driven by toothed wheels which generally mesh with the guide links and/or drive links. Neither the connecting links nor the guide and/or drive links pose any great problem and the wear that they undergo is reasonable. This is not, however, the case with cutting links which are easily blunted and have to be sharpened or replaced very frequently.

The cutting links of chains for machines for cutting to length generally comprise a support member arranged to slide on the blade of the machine and a cutting element solidly connected to the support member. This cutting element can be welded to the support member or it may form a sharpened and hardened part of said support member. In both cases, the cutting link has disadvantages. If the cutting element is an integral part of the support member, the prior art link is made of hardened steel. It easily becomes blunt and has to be sharpened quite frequently. In the event of the machine for cutting to length encountering hard objects, the cutting links are generally damaged and have to be changed. If the cutting element is welded to the support member to form the link, it often happens that the weld does not remain intact because of the effect of vibrations, particularly in cases where the chain encounters hard portions in the parts that are to be sawn. Finally, when the cutting link is made of a relatively hard material, it breaks more readily than when it is made of a less hard metal, for example, of a steel having a degree of elasticity.

The object of the present invention is to overcome these disadvantages and to provide a cutting link for a chain cutter that has a cutting element which has great hardness and at the same time remains firmly connected to the support member. The link is therefore intended to be able to withstand shock without the cutting element becoming detached from the link.

According to the invention, the cutting link for a chain cutter comprises a support member adapted to slide on a guide, and a cutting element solidly connected to the support member, which cutting link is characterised in that the support member comprises two parallel flanks interconnected by a cross-piece, the cutting element taking the form of a small plate of hard metal and being disposed transversely with respect to the two flanks of the support member in an opening in said flanks in such a manner that the cutting edges thereof project beyond the cross-piece, and the rear surface of the cutting element relative to the direction of cutting movement, a central stud which is enclosed by the two flanks and the connecting cross-piece.

In a preferred embodiment, the two flanks each have in said opening a retaining notch, into which is engaged the edge of the cutting element that is remote from the cutting end, the connecting cross-piece being a bent portion interconnecting the two lateral flanks and forming a rounded zone.

The two flanks of the support member may have drilled holes corresponding to the front and rear of the link, these holes being intended to receive pins for connection to a guide and/or drive link or a connecting link.

At the front, the support member may have two guide portions followed by an open portion preceding the small cutting plate, the stud of which is surrounded by the rounded zone of the bent part.

The small cutting plate may be made of tungsten carbide.

The small plate may form an angle $\theta$ which may vary from 0° to 45° in relation to a perpendicular at the plane of symmetry of the link, the small plate being inclined to the left or to the right in relation to forward movement of the link.

The invention also provides a method of manufacturing a cutting link, in which method the support member of the link is initially as a blank from metal in strip or sheet form, a small cutting plate is then placed in an opening on the axis of the support member blank, the blank being then doubled about said axis whereby its flanks enclose the stud of the small plate between said flanks and the interconnecting cross-piece.

The attached drawings illustrate, by way of example, an embodiment as well as a variant of a cutting link for a chain cutter, and particularly for a machine for cutting to length.

Figure 3:
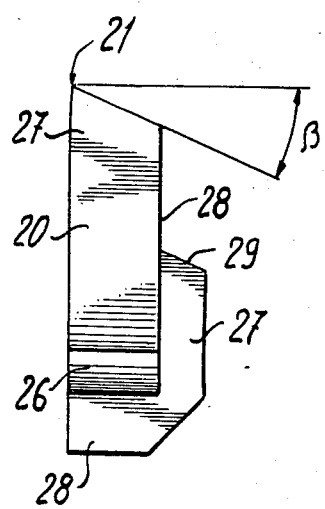
Figure 2:
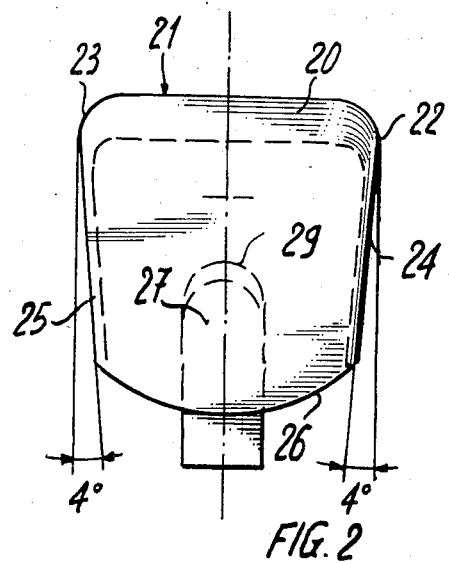

In the drawings:

FIG. 1 is a plan view of a support member of a cutting link following a stamping operation carried out with the aid of a die on strip or sheet metal, the support member still being in one plane, FIG. 2 is a front view of a small cutting plate made of hard metal, in particular tungsten carbide, which is to be enclosed in the support member shown in FIG. 1, FIG. 3 is a side view of the small cutting plate of FIG. 2, FIG. 4 is a side view of a support member of a cutting link after the latter has been bent and the cutting plate shown in FIGS. 2 and 3 has been enclosed in the support member during bending to form the link, FIG. 5 is a front view of the link of FIG. 4, FIG. 6 is a side view of a variant of the cutting link illustrated in FIGS. 1 to 5, the support member enclosing the small cutting plate at a sharp angle to the direction of forward movement of the link, FIG. 7 is a plan view of the link shown in FIG. 6, FIG. 8 is a front view of the link shown in FIG. 6.

A support member 1 which is to form a cutting link has two flanks 2 and 3 which are symmetrical in relation to an axis 4. The central portion of the support member has a cut-away portion delimiting a partial frusto-conical section 6 symmetrical in relation to the axis 4, and forming an angle $\alpha$ of 136°, two symmetrical notches 7 and 8 and two projections 9 and 10 forming the upper forward portions of the flanks 2 and 3. When the support member 1 is to be bent to bring the flanks 2 and 3 parallel with each other, the opening 5 will form an open portion following the two projections 9 and 10, and the notches 7 and 8 will retain the lower end of a small cutting plate which will be enclosed in the support member 1.

The flanks 2 and 3 contain drilled holes 11, 12 and 13, 14 respectively which are brought into register when the support member is bent and which serve to accommodate pins for connecting the cutting link, formed by means of the support member 1, to the front and rear of the guide and/or drive links or of the connecting links, which are not described in the present Application. Finally, the flanks 2 and 3 of the support member 1 have two cut-away portions 15 and 16 of part-circular form.

The cutting element is illustrated in FIGS. 2 and 3 and comprises a small plate 20 of tungsten carbide having a cutting edge which comprises a leading straight edge 21 and, at oposite side edges of the plate, rounded portions 22, 23 and respective adjacent straight portions 24, 25. The lower edge 26 of the small plate is not sharpened and has a circular profile, the edge being at right angles to the front and rear surfaces 27, 28 of the plate. It is this rounded portion 26 that is retained in the notches 7 and 8 in the support member when bending about the axis 4 (FIG. 1) takes place. The edges 21, 22, 23, 24 and 25 are cutting edges and form an angle $\beta$ with the vertical that may vary between 0° and 30°. For cutting wood, this angle $\beta$ will be approximately 22°. The angle formed between the portions 24, 25 and the vertical is 4°. At its middle, the small plate 20 has a stud 27, a portion 28 of which extends below the small plate.

It is obvious that the form of the small plate 20, illustrated in FIGS. 2 and 3, can be varied. The cutting edge 21 may be of rounded form, for example. On the other hand, the central stud 27 may also be of some other shape. However, if the bending operation along the axis 4 of the support member 1 is to produce a rounded zone, then the upper portion 29 of the stud 27 will preferably also be of rounded shape so as to enable it to match the inner surface of the support member 1 after bending has been carried out. As illustrated in FIGS. 4 and 5, the small plate 20 forms an angle of $\gamma$ with the vertical, which angle can vary between 0° and 45°. When wood is to be cut, the angle $\gamma$ will be approximately 15°, and the angle of rake $\epsilon$ will be approximately 7°. In FIGS. 4 and 5 it will be seen that, after bending over a rounded zone around the axis 4, the flanks 2 and 3 of the support member 4 are brought into a position in which they are parallel to each other, and a rounded zone 30 is formed about the stud 27, which zone is applied to the circular surface 29 of the stud 27. The end 26 of the plate 20 is introduced into the notches 7 and 8 in the support member 1 so that the small plate is retained in the link by the sides of the flanks 2 and 3 and the rounded zone 30. A spot weld 31 may be made between the support member 1 and the plate 20 for the purpose of preventing any relative movement between the two parts. It will be obvious to a person skilled in the art that the spot weld 31 does not serve to fix the two parts relatively to each other, such fixing being achieved as a result of the small plate being enclosed in the support member 1 by mechanical means consisting of the notches 7 and 8, and in the bent portion formed around the stud 27. As an alternative to spot welding, the connection between the small plate and the support member may also be achieved by brazing.

The cutting link that has been described by reference to FIGS. 1 to 5 may advantageously be used for cutting relatively hard materials such as oak, or for cutting stone, concrete, etc. For cutting softer materials, consisting for example of wood such as fir, it is advantageous to provide a cutting link, the small plate of which is laterally inclined in relation to its forward movement. Such a link is illustrated in the variant shown in FIGS. 6, 7 and 8. In this variant, the support member 40 is slightly modified compared with the support member 1 of the embodiment illustrated in FIGS. 1 to 5. Cut-locating projections 41 and 42 precede a cut-away portion 43 leaving an opening in front of the cutting plate 44 which extends transversely but not, as before, at an angle of 90° in relation to the plane of symmetry 45 (FIG. 7) of the link. This plane of symmetry 45 is located at the same distance from the two flanks 46 and 47 of the member 40, which flanks are parallel to each other and are interconnected by a bent rounded portion 48. As illustrated in FIGS. 6 to 8, the small plate 44 is of quadrangular shape and comprises three bevelled side portions 49, 50 and 51, all three of which, together with the front portion of the plate, form a cutting edge. At its lower portion, the plate has a retaining stud 52 similar to the stud 27 associated with the plate of the embodiment illustrated in FIGS. 1 to 5. The opening 43 formed in the member 40 is formed in the portion where it is in contact with the rear surface of the plate, the arrangement being asymmetrical so as to match the rear surface of the plate 44 while retaining the latter in a transverse position in relation to the forward movement of the link. The plate 44 is retained in the support member 40 so as to define an angle $\theta$ of lateral slope which may vary from 0° to 45°. Apart from this lateral slope $\theta$, shown in FIG. 7, the plate 44, as in the case of the plate used in the embodiment illustrated in FIGS. 1 to 5, has a cutting angle $\gamma$ and an angle of rake $\epsilon$ varying within the same limits as those of the corresponding angles of the embodiment shown in FIGS. 1 to 5.

In the case where links of the form illustrated in FIGS. 6, 7 and 8 are to be manufactured with a lateral slope defined by the angle $\theta$, it is essential to provide two types of link, one having a lateral inclination to the left, and the other a lateral inclination to the right. FIG. 7 shows, in broken lines, a plate 53 which will have the corresponding inclination relative to the plate 44. When a chain is fitted, a link inclined to the left will be put in place and then a link inclined to the right, this followed again by a link inclined to the left and so on, it being understood that guide and/or drive links are inserted between each cutting link.

In the variant shown in FIGS. 6, 7 and 8, the plate is of asymmetrical shape. The person skilled in the art will appreciate that it is not necessary for the plate 44 to be of asymmetrical shape. In a modified arrangement, the plate 44 may be as illusrated at 54 in FIG. 8 so as to provide symmetrical plates.

As mentioned above, the cutting elements are preferably made of tungsten carbide. However, they may also be made from some other hard material, for example, titanium carbide, or in any other material preferably having a hardness equivalent to that of tungsten carbide or titanium carbide. The support members are made in a material of lesser hardness, for example, steel. Preference will be given to steels having a Vickers hardness of 540 to 620 under a load of 20 kg. Such hardness corresponds to the steel specified in the German Standard DIN Mk 75.

The links that have been described are generally connected, by means of pins not illustrated, to guide links, likewise not illustrated, which are introduced between the flanks 2 and 3 of the cutting link illustrated in FIGS. 1 to 5 and 6 to 8 respectively, of the drawings, the guide links being connected to other guide links, not illustrated, by means of two connecting links, again not shown, placed one on each side of the guide links. After the connecting links, which are generally of double construction, there is fitted a guide link and then another cutting link.

The advantage of the cutting link that has been described resides in the fact that it is made from a supporting member manufactured in a steel that is not too hard, so as to prevent the link from breaking; this steel member encloses a cutting tool, the thickness of which can be selected as required and which has a very much greater hardness than that of the support member. The fact that the cutting element is enclosed in the support member results in an inseparable connection between the two parts. The chain formed with the aid of the links that have been described has strength qualities which are very much greater than those of conventional chains. It is obvious that the chain should be made to suit different purposes, i.e. for cutting wood or stone, for example. To suit these uses, all that is required is to change the cutting angle $\gamma$, the angle of rake $\epsilon$ and the transverse angle $\theta$ of the cutting plates relative to the support members.

I claim:

1. A cutting link for a chain cutter comprising a support member adapted to slide on a guide, and a cutting element solidly connected to the support member, which cutting link is characterised in that the support member comprises two parallel longitudinally extending flanks, interconnected by a cross-piece at one end thereof, each flank having a notch therein adjacent said cross-piece, said cutting element taking the form of a small plate of hard metal and being disposed transversely with respect to the two flanks of the support member in said notches wherein said cutting element is rigidly maintained in said support member, such that the cutting edges thereof project beyond the cross-piece, and the rear surface of the cutting element relative to the direction of cutting movement, a central stud on said cutting element which is enclosed by the two flanks and the connecting cross-piece.

2. A link according to claim 1, wherein the support member is made in one piece, the connecting cross-piece being the portion interconnecting the two lateral flanks and forming therewith a rounded zone having the shape of an inverted U.

3. A link according to claim 2, wherein the two flanks of the support member have drilled therein holes corresponding to the front and rear of the link for receiving pins for connection to an adjacent guide link or connecting link.

4. A link according to claim 2 or claim 3, wherein the support member has at its forward end two cut-locating projections, rearward of which is said opening, the cutting plate being disposed at the rearward end of said opening and having said stud thereof surrounded by the rounded zone of the bent portion.

5. A link according to claim 3, wherein the cutting plate is made of tungsten carbide or material having substantially the same hardness as tungsten carbide.

6. A link according to claim 3, wherein the cutting plate forms a cutting angle $\gamma$ in the range 0° to 45° and an angle of rake $\epsilon$ of up to 20°.

7. A link according to claim 3, wherein the supporting member and the cutting plate are secured together by brazing.

8. A link according to claim 3, wherein the cutting plate is inclined at an angle $\theta$ of up to 45° to a perpendicular to the plane of symmetry of the link, the plate being inclined to the left or to the right in relation to the direction of forward movement of the link.

9. A link according to claim 3, wherein the plate forms an angle $\theta$ of 0° with the perpendicular of the plane of symmetry of the link.

10. A method of manufacturing a link of the type set forth in claim 1, wherein the support member of this link is initially a blank taken from metal in strip or sheet form, a small cutting plate is then placed in an opening on the axis of the support member blank, the blank is then doubled about said axis whereby its flanks enclose the stud of the small plate between said flanks and the interconnecting cross-piece.

11. A cutter chain characterised in claim 1.

* * * * *